(12) United States Patent
Smith et al.

(10) Patent No.: US 11,009,297 B2
(45) Date of Patent: May 18, 2021

(54) FLUIDICIALLY COUPLED HEAT PIPES AND METHOD THEREFOR

(71) Applicant: WorldVu Satellites Limited, Jersey (GB)

(72) Inventors: Alexander D. Smith, San Jose, CA (US); Armen Askijian, Sunnyvale, CA (US); Daniel W. Field, Sunnyvale, CA (US); James Grossman, Sunnyvale, CA (US)

(73) Assignee: WORLDVU SATELLITES LIMITED, Jersey (GB)

( * ) Notice: Subject to any disclaimer, the term of this patent is extended or adjusted under 35 U.S.C. 154(b) by 1313 days.

(21) Appl. No.: 14/687,640

(22) Filed: Apr. 15, 2015

(65) Prior Publication Data

US 2016/0305714 A1 Oct. 20, 2016

(51) Int. Cl.
*F28D 15/02* (2006.01)
*B64G 1/50* (2006.01)
*B23P 15/26* (2006.01)
*F28D 21/00* (2006.01)
*B64G 1/10* (2006.01)
(Continued)

(52) U.S. Cl.
CPC ............ *F28D 15/02* (2013.01); *B23P 15/26* (2013.01); *B64G 1/503* (2013.01); *B64G 1/506* (2013.01); *F28D 15/0233* (2013.01); *F28D 15/0275* (2013.01); *B23P 2700/09* (2013.01); *B64G 1/1007* (2013.01); *B64G 1/443* (2013.01); *B64G 1/66* (2013.01); *F28D 2015/0216* (2013.01); *F28D 2021/0021* (2013.01)

(58) Field of Classification Search
CPC .......... B64G 1/00; B64G 1/503; B64G 1/506; B64G 1/1007; B64G 1/443; B64G 1/66; B23P 15/26; B23P 2700/09; F16L 59/121; F16L 59/12; F28D 15/0233; F28D 15/02; F28D 15/0275; F28D 2015/0216; F28D 2021/0021
See application file for complete search history.

(56) References Cited

U.S. PATENT DOCUMENTS 4,324,375 A * 4/1982 O'Neill .................. B64G 1/50
165/104.14
4,325,124 A * 4/1982 Renner .................. B64G 1/24
701/13
(Continued)

FOREIGN PATENT DOCUMENTS

EP 2535276 B1 7/2014
KR 20110014856 A 2/2011
WO WO-2014197695 A1 * 12/2014 ............. B46G 1/503

OTHER PUBLICATIONS

Authorized Officer: Blaine R. Copenheaver, "International Search Report", dated Jul. 8, 2016 in counterpart International PCT Application No. PCT/US2016/027685.
(Continued)

*Primary Examiner* — Gordon A Jones
(74) *Attorney, Agent, or Firm* — Sughrue Mion, PLLC (57) ABSTRACT

A passive thermal system for use in aerospace vehicles includes a plurality of core-bearing radiator panels having at least one heat pipe embedded therein. The portion of the heat pipe embedded in each panel is fluidically coupled to the portions of the heat pipe in the other core-bearing radiator panels.

22 Claims, 9 Drawing Sheets

(51) Int. Cl.
  *B64G 1/44* (2006.01)
  *B64G 1/66* (2006.01)

(56) References Cited

U.S. PATENT DOCUMENTS

| | | | | |
|---|---|---|---|---|
| 4,573,651 A * | 3/1986 | Stanton | | B64G 1/24 |
| | | | | 244/165 |
| 4,706,740 A * | 11/1987 | Mahefkey | | B64G 1/503 |
| | | | | 165/104.14 |
| 4,747,567 A * | 5/1988 | Johnson | | B64G 1/222 |
| | | | | 136/245 |
| 4,832,113 A * | 5/1989 | Mims | | B64G 1/222 |
| | | | | 165/41 |
| 5,149,022 A * | 9/1992 | Flament | | B64G 1/24 |
| | | | | 244/168 |
| 5,310,144 A * | 5/1994 | Salvatore | | B64G 1/24 |
| | | | | 136/292 |
| 5,372,183 A * | 12/1994 | Strickberger | | B64G 1/503 |
| | | | | 165/41 |
| 5,407,727 A * | 4/1995 | Newell | | B01D 63/02 |
| | | | | 428/188 |
| 8,157,217 B1 | 4/2012 | Anderson | | |
| 8,820,684 B2 * | 9/2014 | McKinnon | | B64G 1/50 |
| | | | | 244/171.8 |
| 9,027,887 B2 * | 5/2015 | Polle | | B64G 1/26 |
| | | | | 244/158.6 |
| 9,889,951 B1 * | 2/2018 | Wong | | B64G 1/506 |
| 2002/0145082 A1 * | 10/2002 | Bertheux | | B64G 1/503 |
| | | | | 244/172.6 |
| 2003/0057330 A1 * | 3/2003 | Deel | | B64G 1/443 |
| | | | | 244/172.8 |
| 2003/0121639 A1 * | 7/2003 | Nomura | | F28D 15/0275 |
| | | | | 165/41 |
| 2008/0257525 A1 * | 10/2008 | Ohnishi | | B64G 1/506 |
| | | | | 165/41 |
| 2009/0230250 A1 * | 9/2009 | Wehner | | B64G 1/283 |
| | | | | 244/172.7 |
| 2011/0155858 A1 * | 6/2011 | Lagadec | | B64G 1/1021 |
| | | | | 244/171 |

OTHER PUBLICATIONS

Authorized Officer: Blaine R. Copenheaver, "Written Opinion of the International Searching Authority", dated Jul. 8, 2016 in counterpart International PCT Application No. PCT/US2016/027685.

* cited by examiner

FIG. 9 ded into the honeycomb panels. Once embed-
FLUIDICALLY COUPLED HEAT PIPES AND METHOD THEREFOR

FIELD OF THE INVENTION

The present invention relates to earth-orbiting communication satellites.

BACKGROUND OF THE INVENTION

Communication satellites receive and transmit radio signals from and to the surface of the Earth. Although Earth-orbiting communications satellites have been in use for many years, providing adequate cooling and heat distribution for the thermally sensitive electronics components onboard such satellites continues to be a problem.

There are two primary sources of heat with which a satellite's thermal systems must contend. One source is solar radiation. Solar radiation can be absorbed by thermal insulation shields or readily reflected away from the satellite by providing the satellite with a suitably reflective exterior surface. A second source of heat is the electronics onboard the satellite. The removal of electronics-generated heat is more problematic since such heat must be collected from various locations within the satellite, transported to a site at which it can be rejected from the satellite, and then radiated into space.

Passive thermal panels can be used to dissipate heat from satellites. In one configuration, the passive thermal panel includes a honeycomb core having heat pipes embedded therein. A heat pipe is a closed chamber, typically in the form of tube, having an internal capillary structure which is filled with a working fluid. The operating-temperature range of the satellite sets the choice of working fluid; ammonia, ethane and propylene are typical choices. Heat input (i.e., from heat-generating electronics) causes the working fluid to evaporate. The evaporated fluid carries the heat towards a colder heat-output section, where heat is rejected as the fluid condenses. The rejected heat is absorbed by the cooler surfaces of the heat-output section and then radiated into space. The condensate returns to the heat input section (near to heat-generating components) by capillary forces to complete the cycle.

When two mechanically independent honeycomb panels need to be thermally coupled, such as to move heat from one panel to the next, an external "jumper" heat pipe or thermal strap is used. The jumper or thermal strap bridges the heat pipes within the two panels via a bolted interface. Because the heat pipe embedded within a given panel is a self-contained structure, the thermal interface between that heat pipe and another heat pipe is conduction only. In some cases, a small part of an embedded heat pipe from one panel will protrude therefrom and interface conductively with the embedded heat pipe in the adjacent panel.

Because each of the thermal interfaces in the scenarios discussed above is a conduction-only interface, a significant thermal resistance is created to the flow of heat from panel to panel, even when using state-of-the-art interface materials and techniques.

Figure 4:
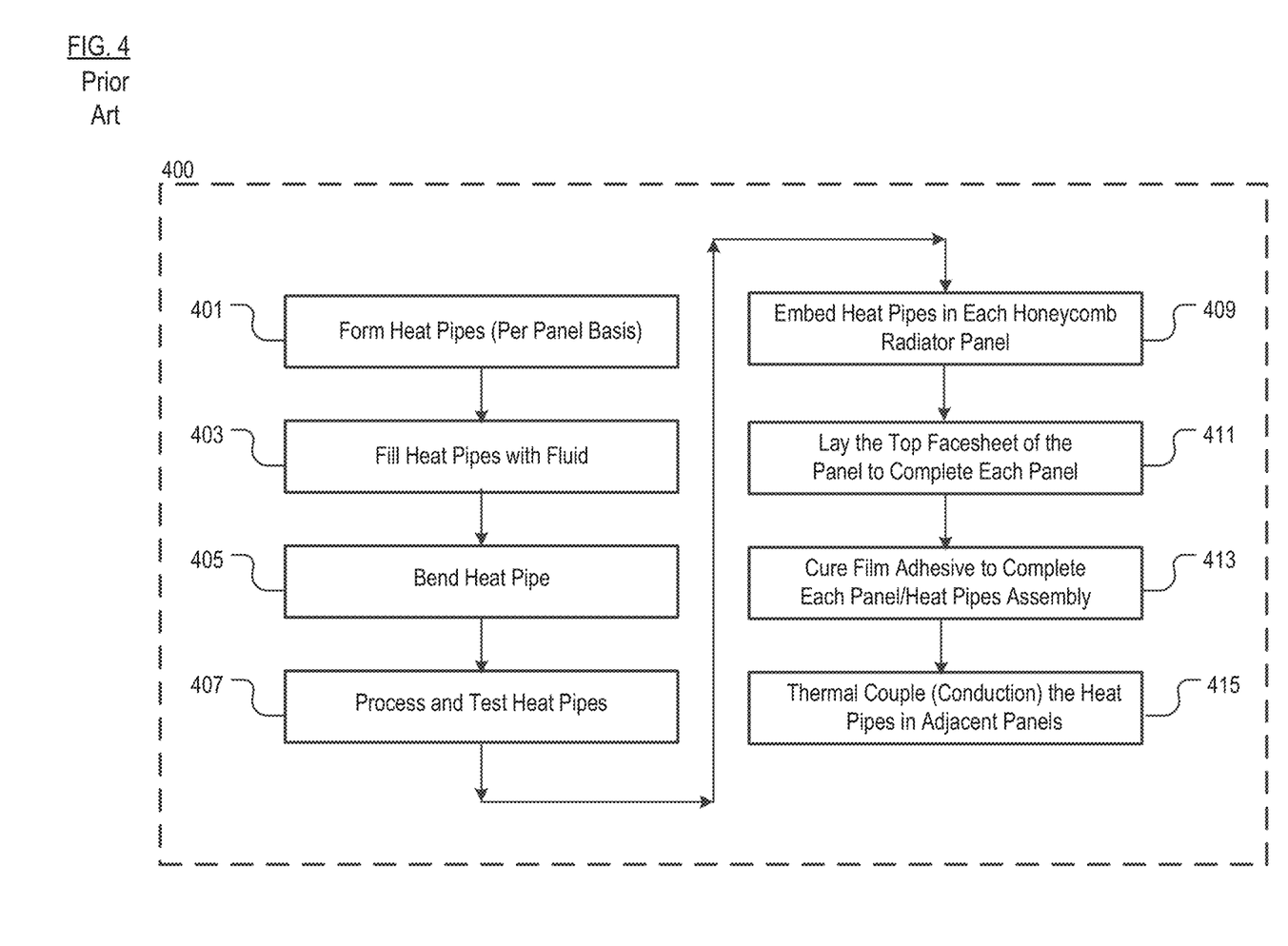
FIG. 4 depicts a method in the prior art for embedding heat pipes in a honeycomb radiator panel.

FIG. 4 depicts a method in the prior art for forming a passive thermal system consisting of a several honeycomb radiator panels and a plurality of heat pipes. In accordance with step 401 of method 400, the heat pipes are formed. Suppose, for example, that the passive thermal system is to have three radiator panels with three heat pipes in each panel. As a consequence, a total of nine heat pipes of appropriate length would be formed, typically via an extrusion process. The heat pipes are then filled with fluid, such as ammonia, per step 403.

In accordance with step 405, the heat pipes are next bent into appropriate shapes, as dictated by the satellite design. For example, there might be various holes in the radiator panels to accommodate wires, rods, etc. that connect structures disposed on the exterior of the satellite to internal components (e.g., processors, motors, etc.). Because each radiator panel has its own captive heat pipes, all bends in the heat pipes are substantially in plane (i.e., parallel to the radiator panel). Filling step 403 and bending step 405 can be performed in reverse order.

The heat pipes are then processed and tested, in known fashion, per step 407. Assuming all the heat pipes pass the test protocol, they are then embedded into the honeycomb radiator panels in accordance with step 409. To continue with the example, three heat pipes would be embedded in each of the three panels. Of course, to embed the heat pipes, one of the two face sheets of metal that sandwich the honeycomb interior of each radiator panel must remain off. And passage ways through the honeycomb core must be formed to accommodate the heat pipes. Care is required to ensure that at the junction between radiator panels, the ends of the heat pipes in the adjacent panels align with one another so that they can be thermally coupled. This requires that each passage way through the honeycomb core of each panel is in the correct location.

In step 411, the second face sheet is placed on each panel. And in step 413, a film adhesive that is used to attach the second face sheet to the honeycomb is cured, thereby completing each panel.

Finally, in step 415, the radiator panels are thermally coupled, such as by using jumpers or thermal straps to thermally couple each heat pipe in one of the panels to a respective heat pipe in the adjacent radiator panel. As previously indicated, the jumpers or thermal straps facilitate conductive heat transfer across the interface of the heat pipes in adjacent panels. Step 415 is rather labor intensive.

A need therefore remains for transporting heat from panel to panel in satellites and other aeronautical applications.

SUMMARY OF THE INVENTION

The present invention provides an improved passive thermal system wherein heat pipes in adjacent radiator panels are fluidically coupled.

In accordance with the illustrative embodiment of the invention, heat-pipe working fluid can flow freely between heat pipe segments in adjacent core-bearing radiator panels (e.g., honeycomb core with aluminum facesheets, etc.) of, for example, a satellite. This completely eliminates the high thermal-resistance conductive interface between adjacent panels in the prior art. Thermal coupling from one side of, for example, a satellite, to the opposite side is thus exceedingly efficient since a heat pipe is typically nearly isothermal.

Forming a passive thermal system in accordance with the illustrative embodiment requires very tight bend tolerances, especially if the radiator panels have unusual orientations with respect to one another. In a method in accordance with the present teachings, heat pipes are embedded in all radiator panels that form the passive thermal system prior to positioning the panels in their final configuration. Once embedded, the panels are moved with respect to one another, resulting in out-of-plane bends in the heat pipes the abutting edges of adjacent radiator panels.

DETAILED DESCRIPTION

Embodiments of the present invention can be used for all types of satellites (e.g., LEO, GEO, etc.) and other aerospace vehicles, as appropriate. Before addressing the specifics of the instant passive thermal system, a satellite in which such a system can be used is described.

Satellite.

Figure 1:
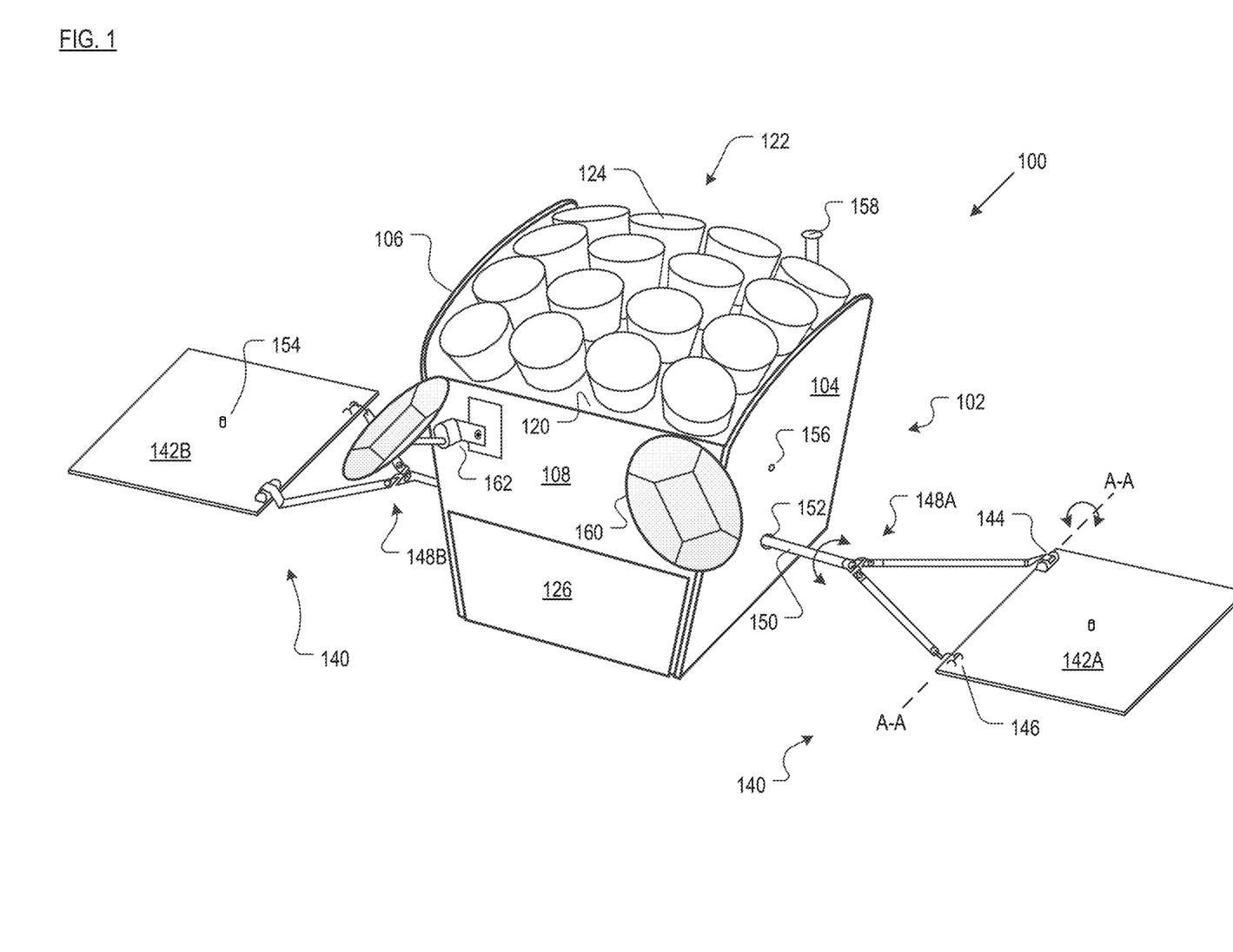
FIG. 1 depicts a satellite in accordance with the present teachings.
Figure 2:
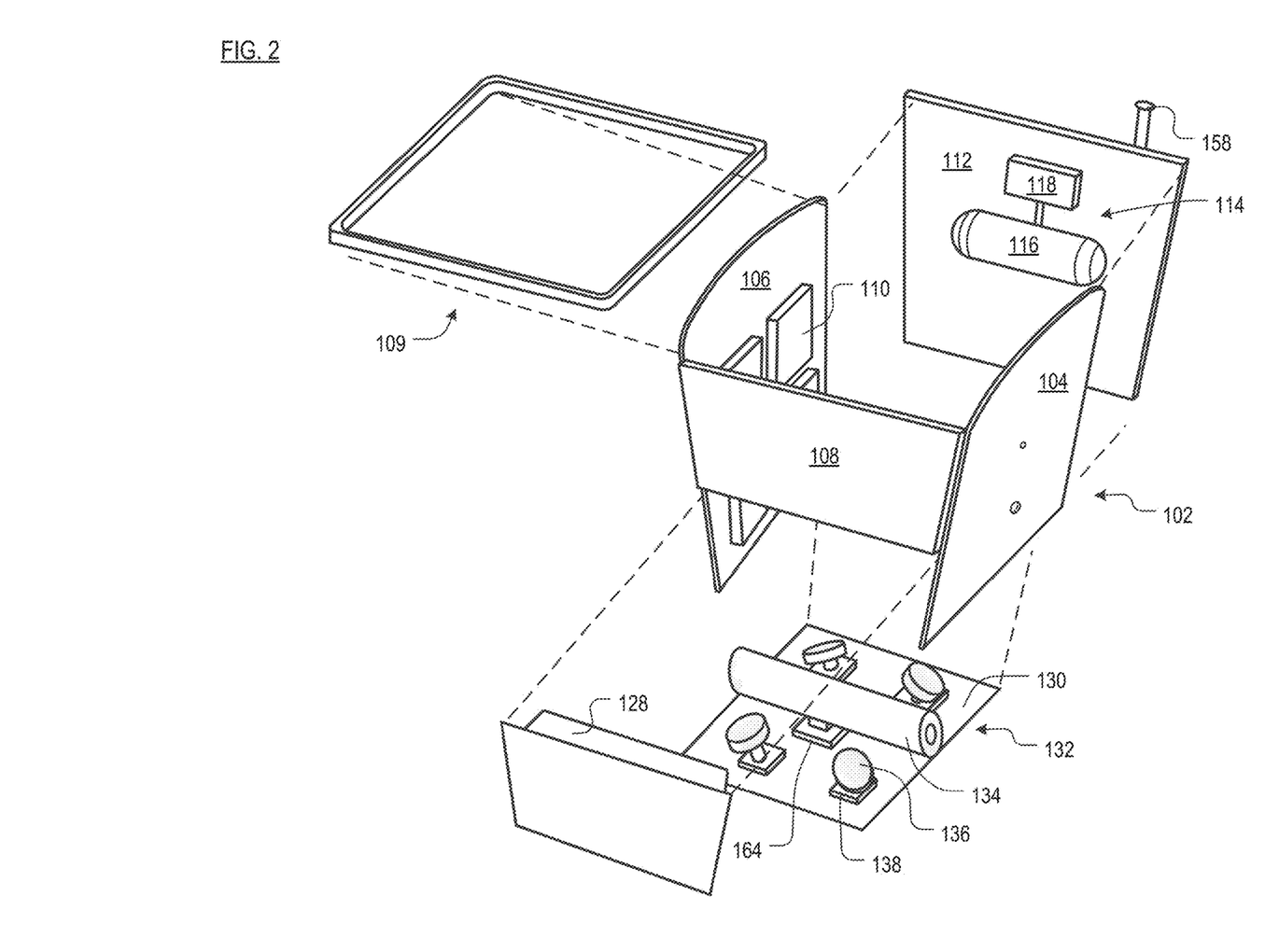
FIG. 2 depicts an exploded view of portions of the satellite of FIG. 1.

FIG. 1 depicts satellite 100 in accordance with the present teachings. FIG. 2 depicts an "exploded" view of some of the salient features of satellite 100. Referring now to both FIGS. 1 and 2, satellite 100 includes unified payload module 102, propulsion module 114, payload antenna module 122, bus component module 132, and solar-array system 140, arranged as shown. It is to be noted that the orientation of satellite 100 in FIGS. 1 and 2 is "upside down" in the sense that in use, antennas 124, which are facing "up" in the figures, would be facing "down" toward Earth.

Unified payload module 102 comprises panels 104, 106, and 108. In some embodiments, the panels are joined together using various connectors, etc., in known fashion. Brace 109 provides structural reinforcement for the connected panels.

Panels 104, 106, and 108 serve, among any other functionality, as radiators to radiate heat from satellite 102. In some embodiments, the panels include adaptations to facilitate heat removal. In some embodiments, the panels comprise plural materials, such as a core that is sandwiched by face sheets. Materials suitable for use for the panels include those typically used in the aerospace industry. For example, in some embodiments, the core comprises a lightweight aluminum honeycomb and the face sheets comprise 6061-T6 aluminum, which are bonded together, typically with an epoxy film adhesive.

Propulsion module 114 is disposed on panel 112, which, in some embodiments, is constructed in like manner as panels 104, 106, and 108 (e.g., aluminum honeycomb core and aluminum facesheets, etc.). Panel 112, which is obscured in FIG. 1, abuts panels 104 and 106 of unified payload module 102.

Propulsion module 114 includes fuel tank 116 and propulsion control system 118. The propulsion control system controls, using one or more valves (not depicted), release of propulsion gas through the propulsion nozzle (not depicted) that is disposed on the outward-facing surface of panel 114. Propulsion control system is appropriately instrumented (i.e., software and hardware) to respond to ground-based commands or commands generated onboard from the control processor.

Payload antenna module 122 comprises a plurality of antennas 124. In the illustrative embodiments, sixteen antennas 124 are arranged in a 4×4 array. In some other embodiments, antennas 124 can be organized in a different arrangement and/or a different number of antennas can be used. Antennas 124 are supported by support web 120. In some embodiments, the support web is a curved panel comprising carbon fiber, with a suitable number of openings (i.e., sixteen in the illustrative embodiment) for receiving and supporting antennas 124.

In some embodiments, antennas 124 transmit in the $K_u$ band, which is the 12 to 18 GHz portion of the electromagnetic spectrum. In the illustrative embodiment, antennas 124 are configured as exponential horns, which are often used for communications satellites. Well known in the art, the horn antenna transmits radio waves from (or collects them into) a waveguide, typically implemented as a short rectangular or cylindrical metal tube, which is closed at one end and flares into an open-ended horn (conical shaped in the illustrative embodiment) at the other end. The waveguide portion of each antenna 124 is obscured in FIG. 1. The closed end of each antenna 124 couples to amplifier(s) (not depicted in FIGS. 1 and 2; they are located on the interior surface of panel 104 or 108).

Bus component module 132 is disposed on panel 130, which attaches to the bottom (from the perspective of FIGS. 1 and 2) of the unified payload module 102. Panel 130 can be constructed in like manner as panels 104, 106, and 108 (e.g., aluminum honeycomb core and aluminum facesheets, etc.). In some embodiments, panel 130 does not include any specific adaptations for heat removal.

Module 132 includes main solar-array motor 134, four reaction wheels 136, and main control processor 164. The reaction wheels enable satellite 100 to rotate in space without using propellant, via conservation of angular momentum. Each reaction wheel 136, which includes a centrifugal mass (not depicted), is driven by an associated drive motor (and control electronics) 138. As will be appreciated by those skilled in the art, only three reaction wheels 136 are required to rotate satellite 100 in the x, y, and z directions. The fourth reaction wheel serves as a spare. Such reaction wheels are typically used for this purpose in satellites.

Main control processor 164 processes commands received from the ground and performs, autonomously, many of the functions of satellite 100, including without limitation, attitude pointing control, propulsion control, and power system control.

Solar-array system 140 includes solar panels 142A and 142B and respective y-bars 148A and 148B. Each solar panel comprises a plurality of solar cells (not depicted; they are disposed on the obscured side of solar panels 142A and 142B) that convert sunlight into electrical energy in known fashion. Each of the solar panels includes motor 144 and passive rotary bearing 146; one of the y-bar attaches to each solar panel at motor 144 and bearing 146. Motors 144 enable each of the solar panels to at least partially rotate about axis A-A. This facilitates deploying solar panel 142A from its stowed position parallel to and against panel 104 and deploying solar panel 142B from its stowed position parallel to and against panel 106. The motors 144 also function to appropriately angle panels 142A and 142B for optimal sun exposure via the aforementioned rotation about axis A-A.

Member 150 of each y-bar 148A and 148B extends through opening 152 in respective panels 104 and 106. Within unified payload module 102, members 150 connect to main solar-array motor 134, previously referenced in conjunction with bus component module 132. The main solar-array motor is capable of at least partially rotating each member 150 about its axis, as shown. This is for the purpose of angling solar panels 142A and 142B for optimal sun exposure. In some embodiments, the members 150 can be rotated independently of one another; in some other embodiments, members 150 rotate together. Lock-and-release member 154 is used to couple and release solar panel 142A to side panel 104 and solar panel 142B to side panel 106. The lock-and-release member couples to opening 156 in side panels 104 and 106.

Satellite 100 also includes panel 126, which fits "below" (from the perspective of FIGS. 1 and 2) panel 108 of unified payload module 102. In some embodiments, panel 108 is a sheet of aerospace grade material (e.g., 6061-T6 aluminum, etc.) Battery module 128 is disposed on the interior-facing surface of panel 126. The battery module supplies power for various energy consumers onboard satellite 100. Battery module 128 is recharged from electricity that is generated via solar panels 142A and 142B; the panels and module 128 are electrically coupled for this purpose (the electrical path between solar panels 142A/B and battery module 128 is not depicted in FIGS. 1 and 2).

Satellite 100 further includes omni-directional antenna 158 for telemetry and ground-based command and control.

Disposed on panel 108 are two "gateway" antennas 160. The gateway antennas send and receive user data to gateway stations on Earth. The gateway stations are in communication with the Internet. Antennas 160 are coupled to panel 108 by movable mounts 162, which enable the antennas to be moved along two axes for optimum positioning with ground-based antennas. Antennas 160 typically transmit and receive in the $K_a$ band, which covers frequencies in the range of 26.5 to 40 GHz.

Convertor modules 110, which are disposed on interior-facing surface of panel 106, convert between $K_a$ radio frequencies and $K_u$ radio frequencies. For example, convertor modules 110 convert the $K_a$ band uplink signals from gateway antennas 160 to $K_u$ band signals for downlink via antennas 124. Convertor modules 110 also convert in the reverse direction; that is, $K_u$ to $K_a$.

In operation of satellite 100, data flows as follows for a data request:
(obtain data): requested data is obtained from the Internet at a gateway station;
(uplink): a data signal is transmitted ($K_a$ band) via large, ground-based antennas to the satellite's gateway antennas 160;
(payload): the data signal is amplified, routed to convertor modules 110 for conversion to downlink ($K_u$) band, and then amplified again;
the payload signal is routed to payload antennas 124;
(downlink): antennas 124 transmit the amplified, frequency-converted signal to the user's terminal.

When a user transmits (rather than requests) data, such as an e-mail, the signal follows the same path but in the reverse direction.

Passive Thermal System.

Figure 3:
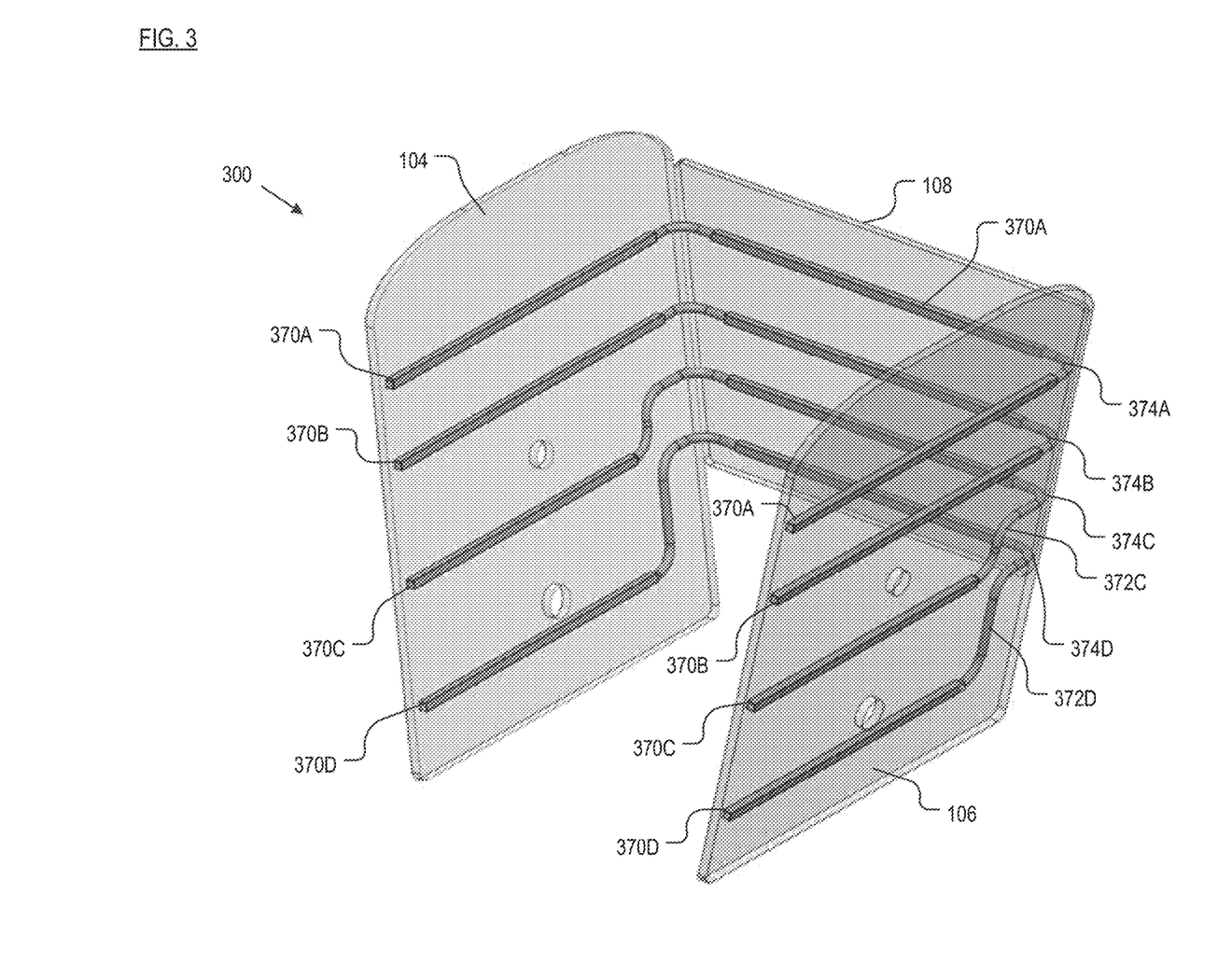
FIG. 3 depicts an embodiment of a passive thermal system for use in conjunction with the satellite of FIGS. 1 and 2, in accordance with the illustrative embodiment of the present invention.

FIG. 3 depicts passive thermal system 300, which includes three individual core-bearing (e.g., honeycomb, etc.) radiator panels, such as panels 104, 108, and 106 of satellite 100 and four heat pipes 370A, 370B, 370C, and 370D (collectively "heat pipes 370"). Each heat pipe runs through all three panels, such that fluid flows uninterrupted through and between panels 104, 108, and 106. Thus, the portion of a given heat pipe in a panel is fluidically coupled to corresponding portions of the heat pipe in other panels that are part of the same passive thermal system. Each heat pipe contains heat-pipe fluid, typically ammonia, although other fluids may suitably be used. The heat pipes are typically formed of aluminum.

As used in this disclosure and the appended claims, the phrase "core-bearing radiator panels" refers to radiator panels that include a core material that is sandwiched by two face sheets. The core material typically provides strength to the radiator panel, while being a very lightweight structure. The face sheets are typically selected for their ability to radiate and conduct heat. This phrase also encompasses a panel that, while not including face sheets, comprises a material that is suitably thick to accommodate heat pipes therein. Panels made from, for example, solid metal, would not be considered "core-bearing radiator panels," since solid metal panels that are suitably thick to embed heat pipes would be far too heavy for use in aerospace applications.

Heat pipes 370C and 370D bend "in-plane" (i.e., in the plane of the radiator panel in which a portion thereof resides) to accommodate the openings through panels 104 and 106. For example, in radiator panel 106, heat pipe 370D has in-plane bend 372D and heat pipe 370C has "in-plane" bend 372C. These two heat pipes have mirror image in-plane bends in radiator panel 104. In some other embodiments, the in-plane bends in radiator panels 104 and 106 are not mirror imaged; rather, they differ to accommodate differences in certain features (e.g., location of holes, add-on instrumentation, etc.) of the two radiator panels.

Furthermore, all four heat pipes 370 also bend "out-of-plane" (i.e., out of the plane of the radiator panel in which a portion thereof resides) to accommodate the orientation of the panels with respect to one another. For example, proximal to the abutting edges of radiator panels 108 and 106, heat pipe 370A has out-of-plane bend 374A, heat pipe 370B has out-of-plane bend 374B, heat pipe 370C has out-of-plane bend 374C, heat pipe 370D has out-of-plane bend 374D. There are also four out-of-planes bends located proximal to the abutting edges of radiator panels 104 and 108. These out-of-of plane bends 374, at least in the context of heat pipes embedded in radiator panels for use in satellites, are unconventional.

The precise nature of each bend (i.e., the bend angle) is dictated by the relative orientation of radiator panels with respect to one another. For example, in passive thermal system 300, the out-of-plane bend angle is about 90 degrees. In other embodiments, the bend angle can be less or more than 90 degrees. This is a function, in many embodiments, of the number of radiator panels defining the exterior of the aerospace vehicle (e.g., satellite, etc.). For example, since satellite 100 is more or less rectangular and has four sides (neglecting a "top" and "bottom"), the radiator panels are oriented at about 90 degrees with respect to one another. In most embodiments, the bend angle of out-of-plane bends will be at least 45 degrees.

As used in this disclosure and the appended claims, the phrase "in-plane bend" or "bend in-plane," when used to refer to a bend in a heat pipe, is to be referenced with respect to a "plane" defined by a core-bearing radiator panel that contains a portion of the heat pipe. Thus, if the panel is considered to extend in the X and Y directions, thereby falling in an X-Y plane (ignoring panel thickness), a bend in the heat pipe (as the heat pipe is oriented in the panel) is "in plane" if it is parallel to the X-Y plane.

As used in this disclosure and the appended claims, the phrase "out-of-plane bend" or "bend out-of-plane," when used to refer to a bend in a heat pipe, is to be referenced with respect to a "plane" defined by a core-bearing radiator panel that contains a portion of the heat pipe. Thus, if the panel is considered to extend in the X and Y directions, thereby falling in an X-Y plane (ignoring panel thickness), a bend in the heat pipe (as the heat pipe is oriented in the panel) is "out-of-plane" if it is not parallel to the X-Y plane.

As used in this disclosure and the appended claims, the phrase "bend angle," when used to refer to an out-of-plane bend in a heat pipe, means the angle subtended by the two portions of the heat pipe on either side of the out-of-plane bend.

Figure 5:
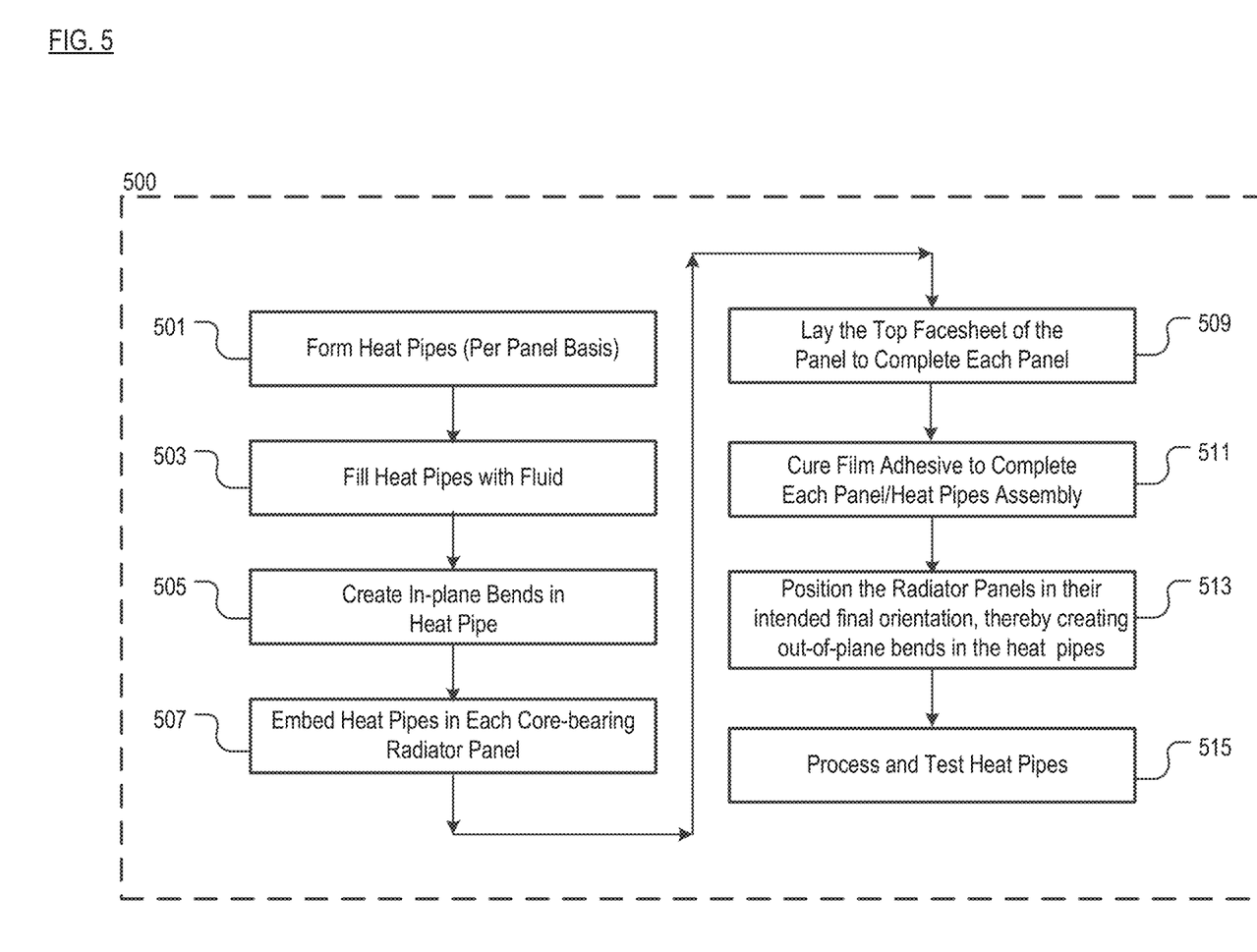
FIG. 5 depicts a method for creating the passive thermal system of FIG. 3.

FIG. 5 depicts method 500 for creating the passive thermal system in accordance with the illustrative embodiment of the present invention.

In accordance with step 501 of method 500, the heat pipes are formed. Using passive thermal system 300 as an example, four heat pipes (i.e., 370A, 370B, 370C, and 370D) are required for use with three radiator panels 104, 106, and 108. By way of comparison, a comparable prior-art arrangement would require, in addition to 3 radiator panels, 12 heat pipes and 8 jumpers/thermal straps.

Figure 6:
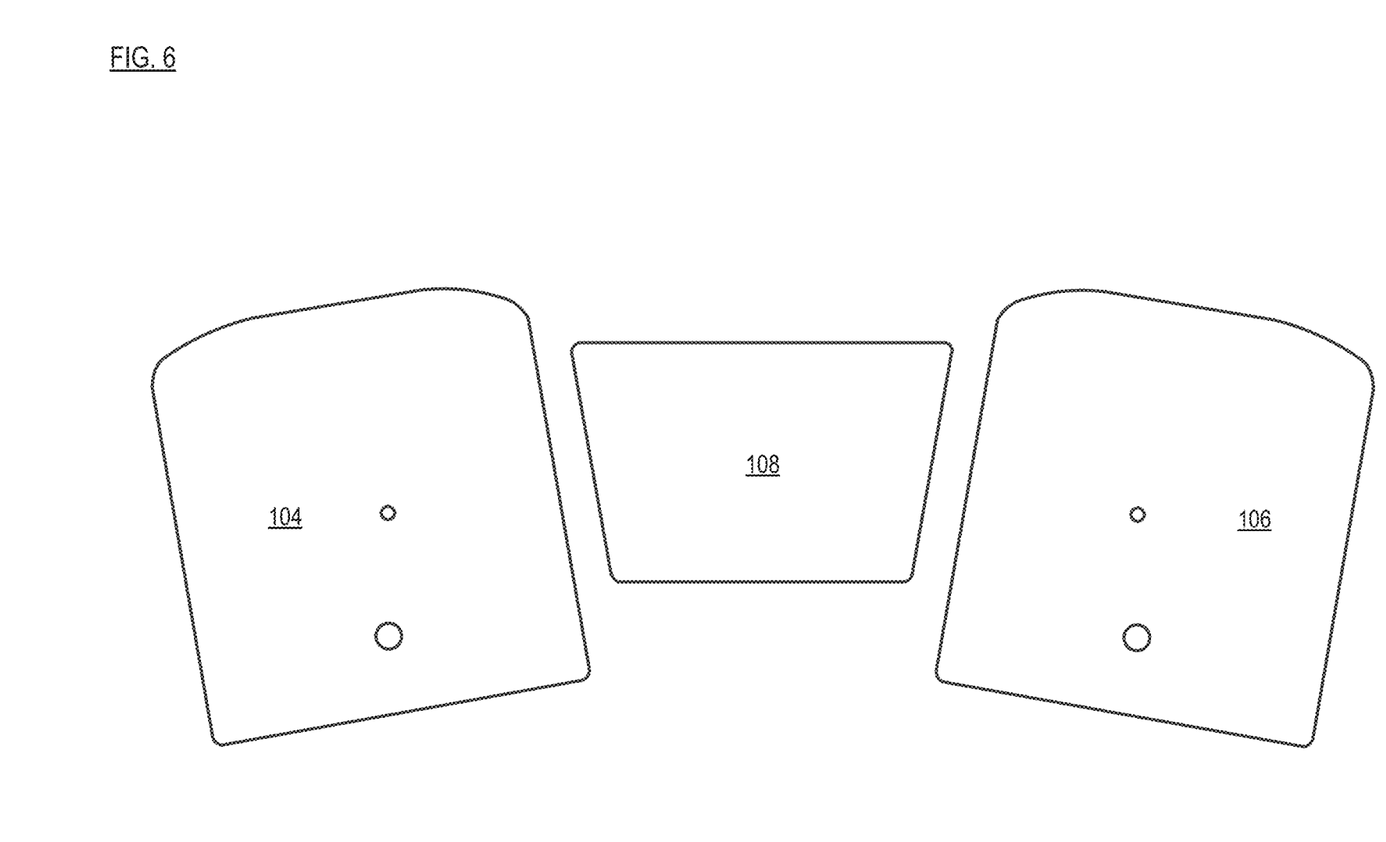
FIG. 6 depicts three honeycomb panels of the satellite of FIG. 1.
Figure 7:
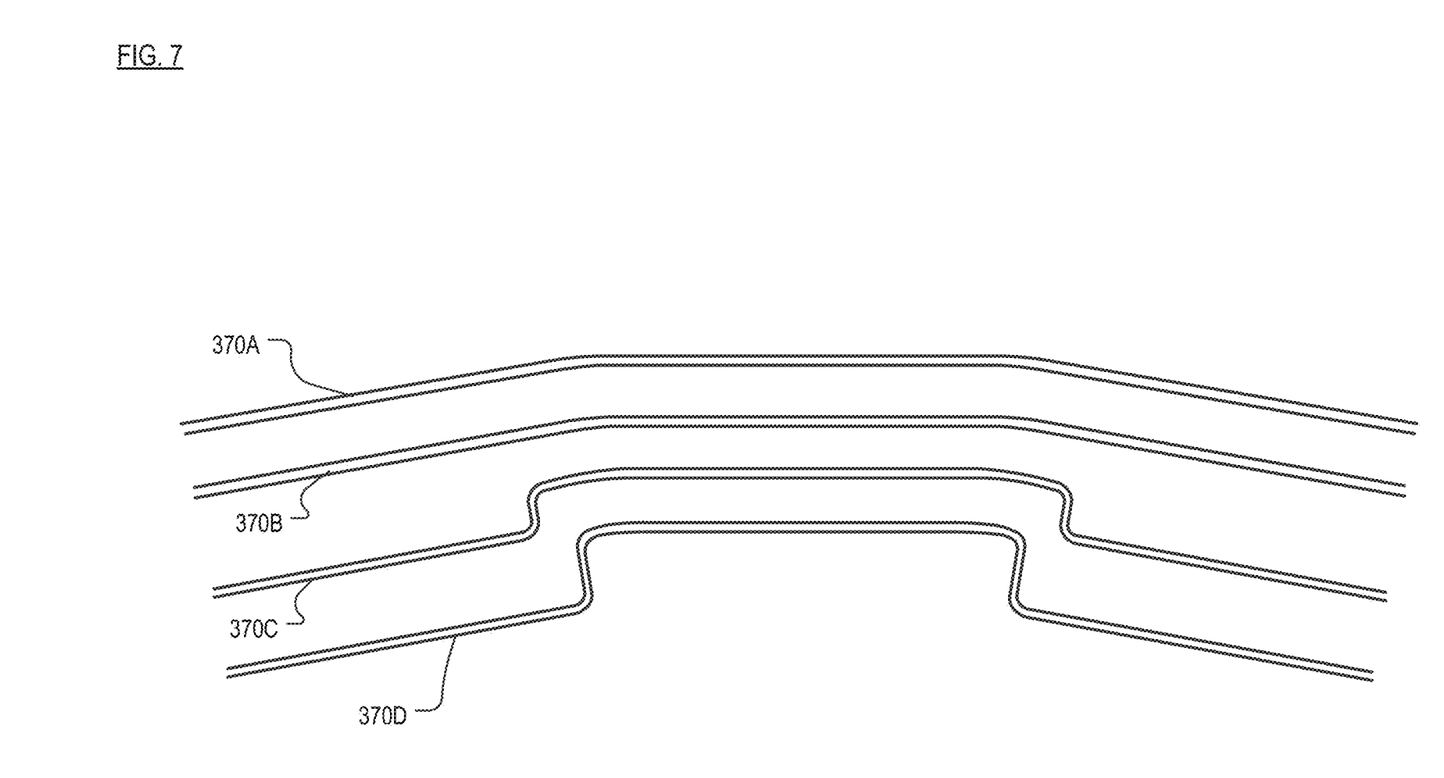
FIG. 7 depicts heat pipes for embedding into the panels of FIG. 6.

Radiator panels 104, 106, and 108, which are part of satellite 100 shown in FIGS. 1 and 2, are depicted in FIG. 6. The four heat pipes, with appropriate in-plane bends, are depicted in FIG. 7. The heat pipes are formed via conventional processing, such as extrusion. Like the prior-art method 400, after the heat pipes are formed, they are filled with working fluid, such as ammonia, per step 503.

In accordance with optional step 505, in-plane bends are formed in one or more heat pipes, if such bends are required to accommodate the configuration of the radiator panels. For example, heat pipes 370C and 370D require in-plane respective bends 372C and 372D so the pipes can be routed past openings 156 and 152 (see FIG. 1). In-plane bending is performed according to known techniques, such as bender dies and mandrel inserts. As in prior-art method 400, filling step 503 and bending step 505 can be performed in reverse order.

Heat pipes 370 are then embedded into all the core-bearing radiator panels in a particular passive thermal system (i.e., 3 panels in the case of passive thermal system 300) in accordance with step 507. To accomplish this, the panels are laid flat, side-by-side. As discussed in conjunction with prior-art method 400, to embed the heat pipes, one of the two face sheets of metal that sandwich the core of each radiator panel must remain off. Appropriate portions of the core material in each of the panels are removed to accommodate the heat pipes. At this point in the method, the radiator panels and the heat pipes are in a planar configuration.

Figure 8:
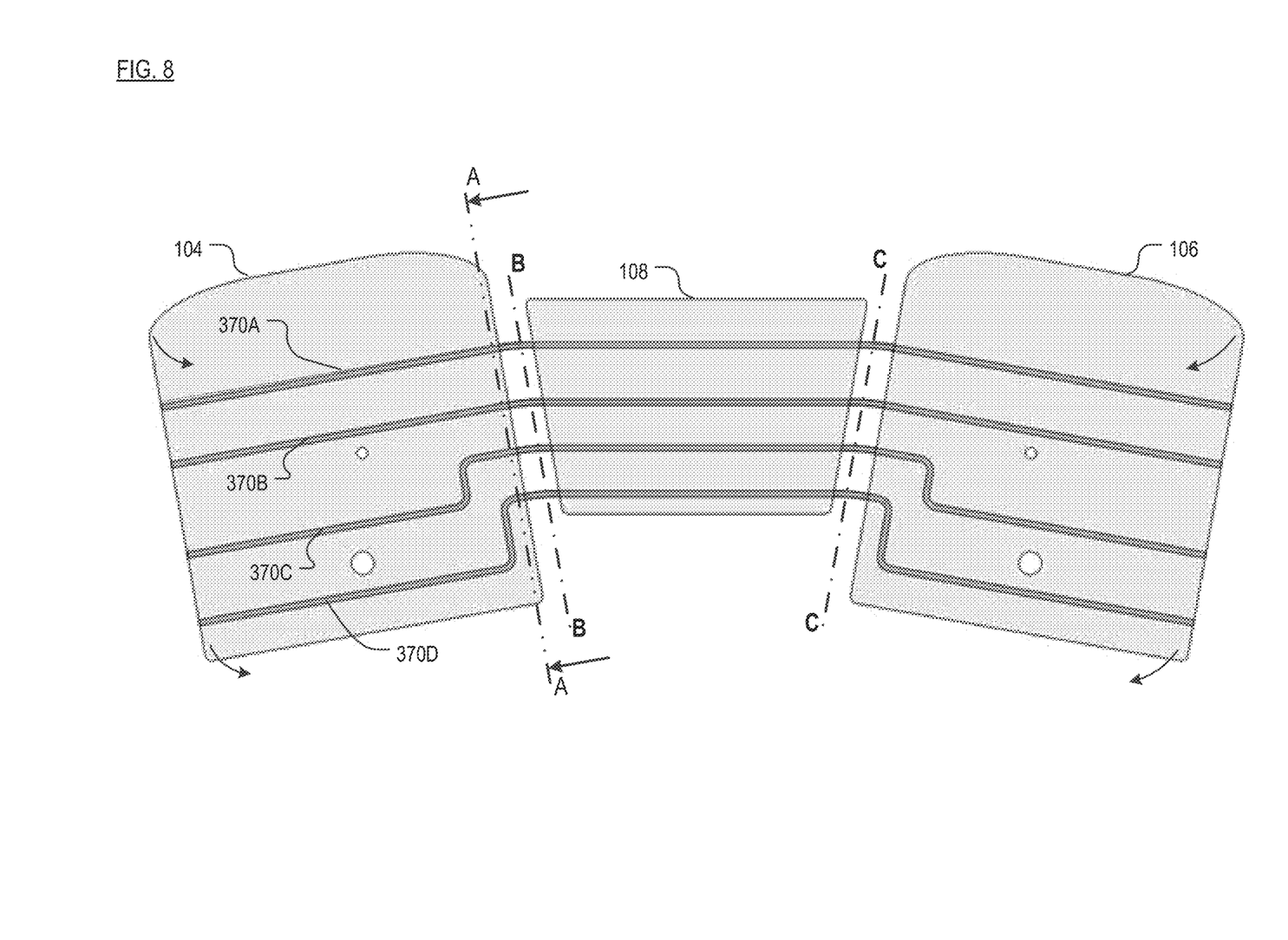
FIG. 8 depicts the heat pipes embedded in the panels of FIG. 6.
Figure 9:
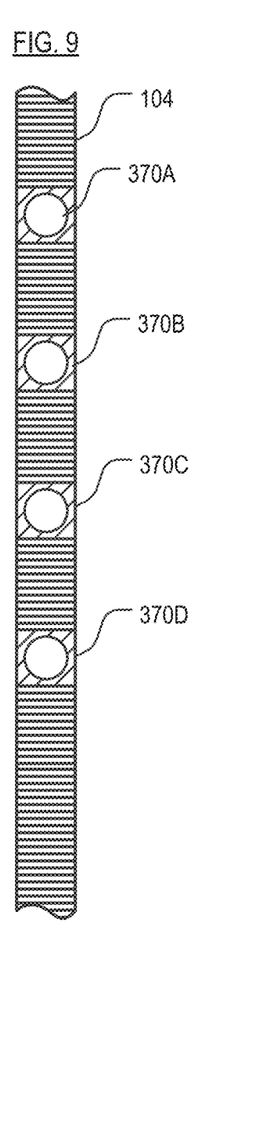
FIG. 9 depicts a cross-sectional view of honeycomb radiator panel 104 (with heat pipes embedded) in FIG. 8 along the line A-A in the direction shown.

FIG. 8 depicts heat pipes 370 embedded in radiator panels 104, 108, and 106. FIG. 9 depicts a cross-sectional view of panel 104 along the line A-A in the direction shown.

In step 509, the second face sheet is placed on each core-bearing radiator panel. In step 511, a film adhesive that is used to attach the second face sheet to the core is cured, thereby completing each panel.

In accordance with embodiments of the present invention, and unlike the prior art, core-bearing radiator panels 104, 108, and 106 are moved (i.e., partially rotated) into their final "use" configuration with respect to one another. With continuing reference to FIG. 8, panel 104 is partially rotated about axis B-B in the direction of the arrows (i.e., forward "out-of-the-page"). Similarly, panel 106 is partially rotated about axis C-C in the direction of the arrows (i.e., forward "out-of-the-page"). This creates, per step 513, out-of-plane bends in all of the heat pipes at the abutting edges of the three panels.

Referencing FIG. 3, at the abutting edges of panels 108 and 106 are: out-of-plane bend 374A (heat pipe 370A), out-of-plane bend 374B (heat pipe 370B), out-of-plane bend 374C (heat pipe 370C), and out-of-plane bend 374D (heat pipe 370D). There are another four out-of-plane bends at the abutting edges of panels 104 and 106. In step 515, the heat pipes are then processed and tested, in known fashion.

Figure 10:
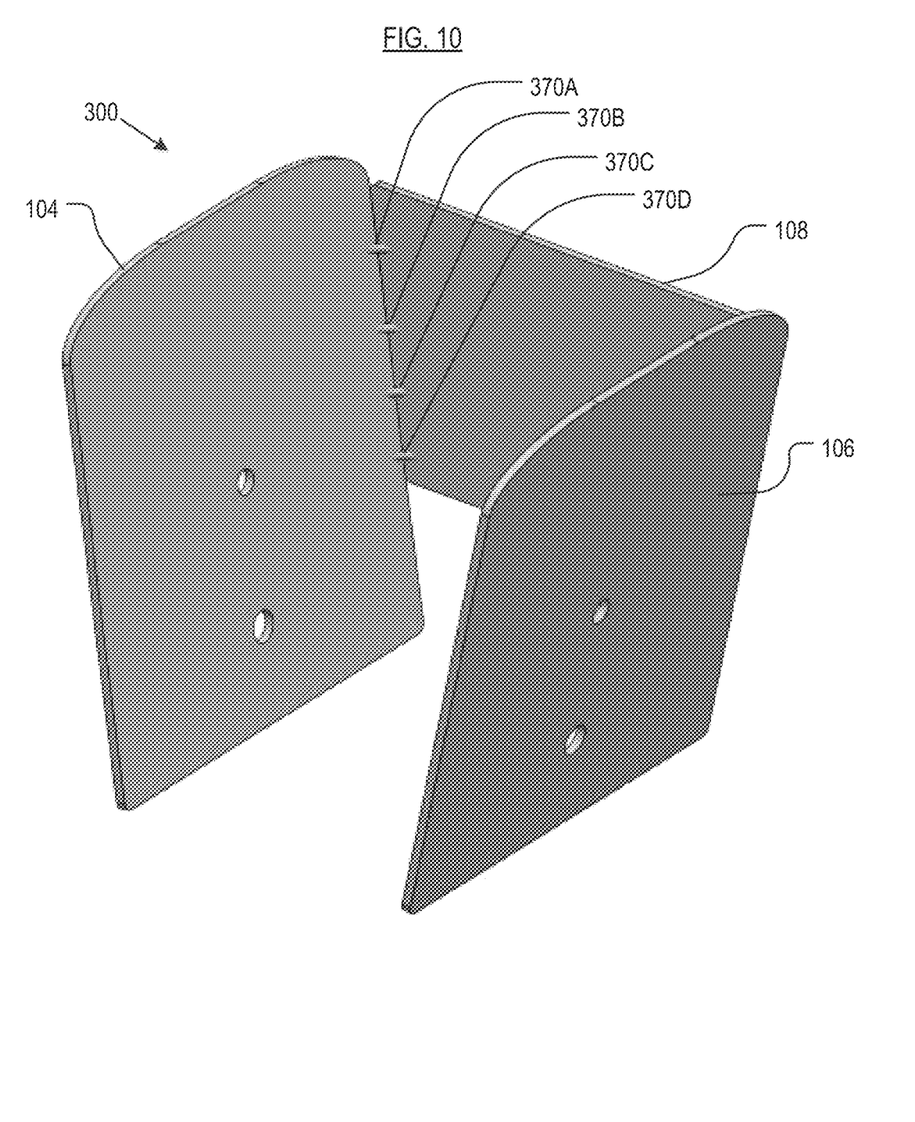
FIG. 10 depicts the completed passive thermal system resulting from the partial rotation, out of plane, of the heat-pipe embedded panels of FIG. 8.

FIG. 10 depicts a completed passive thermal system, such as results from rotating, out-of-plane, the heat-pipe-embedded panels of FIG. 8. Out-of-plane bends of heat pipes 370A, 370B, 370C, and 370D are visible at the abutting edges of panels 104 and 108.

It is to be understood that the disclosure describes a few embodiments and that many variations of the invention can easily be devised by those skilled in the art after reading this disclosure and that the scope of the present invention is to be determined by the following claims.

What is claimed:

1. An aerospace vehicle, wherein the aerospace vehicle includes a passive thermal system, and wherein the passive thermal system comprises:
   a first core-bearing radiator panel, a second core-bearing radiator panel, and a third core-bearing radiator panel, wherein the first core-bearing radiator panel and the third core-bearing radiator panel are arranged opposite each other and linked in part by the second core-bearing radiator panel, wherein the first core-bearing radiator panel and the third core-bearing radiator panel are in non-parallel planes, and the first core-bearing radiator panel and the third core-bearing radiator panel exhibit a structural divergence about a central axis of the aerospace vehicle relative to each other being disposed in the non-parallel planes in that the non-parallel planes tend to diverge from each other in an earth-facing direction about the central axis of the aerospace vehicle; and
   a first heat pipe,
   wherein a first portion of the first heat pipe is disposed in the first core-bearing radiator panel and a second portion of the first heat pipe is disposed in the second core-bearing radiator panel, and wherein the first and second portions of the first heat pipe are fluidically coupled to one another.

2. The aerospace vehicle of claim 1, wherein the first heat pipe has a first out-of-plane bend.

3. The aerospace vehicle of claim 2, wherein the first out-of-plane bend is proximal to abutting edges of the first and second core-bearing radiator panels.

4. The aerospace vehicle of claim 2, wherein the first out-of-plane bend is characterized by a bend angle of at least 45 degrees.

5. The aerospace vehicle of claim 1,
   wherein the passive thermal system further comprises a second heat pipe, wherein a first portion of the second heat pipe is disposed in the first core-bearing radiator panel, wherein a second portion of the second heat pipe is disposed in the second core-bearing radiator panel, and wherein the second portion of the second heat pipe is configured to be longer than the second portion of the first heat pipe in conformance with the structural divergence about the central axis of the aerospace vehicle.

6. The aerospace vehicle of claim 5, wherein a third portion of the first heat pipe is disposed in the third core-bearing radiator panel, and wherein the first, the second, and the third portions of the first heat pipe are fluidically coupled to one another.

7. The aerospace vehicle of claim 6, wherein the passive thermal system further comprises a third heat pipe, wherein:
(a) a first, second, and third portion of the second heat pipe are disposed in the first, the second, and the third core-bearing radiator panels, respectively;
(b) a first, second, and third portion of the third heat pipe are disposed in the first, the second, and the third core-bearing radiator panels, respectively;
(c) the first, second, and third portion of the second heat pipe are fluidically coupled; and
(d) the first, second, and third portion of the third heat pipe are fluidically coupled.

8. The aerospace vehicle of claim 6, wherein the first heat pipe has a second out-of-plane bend, wherein the second out-of-plane bend is proximal to abutting edges of the second core-bearing radiator panel and the third core-bearing radiator panel.

9. The aerospace vehicle of claim 8, wherein the first heat pipe has a first out-of-plane bend, the first out-of-plane bend is characterized by a first bend angle and the second out-of-plane bend is characterized by a second bend angle, and wherein the first bend angle and the second bend angle are the same as one another.

10. The aerospace vehicle of claim 8, wherein the first heat pipe has a first out-of-plane bend, the first out-of-plane bend is characterized by a first bend angle and the second out-of-plane bend is characterized by a second bend angle, and wherein the first bend angle and the second bend angle are different from one another.

11. The aerospace vehicle of claim 1, wherein the aerospace vehicle is a satellite.

12. An aerospace vehicle having a passive thermal system as claimed in claim 1, wherein:
a third portion of the first heat pipe is disposed in the third core-bearing radiator panel, and wherein the first, second, and third portions of the first heat pipe are fluidically coupled to one another.

13. The aerospace vehicle of claim 12, wherein the first heat pipe has a first out-of-plane bend proximal to first abutting edges of the first and second core-bearing radiator panels.

14. The aerospace vehicle of claim 13, wherein the first heat pipe has a second out-of-plane bend proximal to second abutting edges of the second and third core-bearing radiator panels.

15. The aerospace vehicle of claim 12, wherein the aerospace vehicle is a satellite.

16. A method for forming a passive thermal system, wherein the method comprises
embedding a heat pipe in a first core-bearing radiator panel, said first and second core-bearing radiator panels adopted to radiate heat to an external environment, wherein the first core-bearing radiator panel and the third core-bearing radiator panel are arranged opposite each other and linked in part by the second core-bearing radiator panel, wherein the first core-bearing radiator panel and the third core-bearing radiator panel are in non-parallel planes, and the first core-bearing radiator panel and the third core-bearing radiator panel exhibit a structural divergence about a central axis of the aerospace vehicle relative to each other being disposed in the non-parallel planes in that the non-parallel planes tend to diverge from each other in an earth-facing direction about the central axis of the aerospace vehicle;

wherein a first portion of the heat pipe is embedded in the first core-bearing radiator panel and a second portion of the heat pipe is embedded in the second core-bearing radiator panel, and wherein the first portion and the second portion of the heat pipe are fluidically coupled to one another.

17. The method of claim 16, and further comprising positioning the first and second core-bearing radiator panels in a final orientation with respect to one another, the positioning resulting in a first out-of-plane bend in the heat pipe proximal to abutting edges of the first and second core-bearing radiator panels.

18. The method of claim 17, wherein positioning the first and second core-bearing radiator panels in a final orientation comprises partially rotating the first and second core-bearing radiator panels with respect to one another in an amount of at least 45 degrees, thereby resulting in a bend angle of at least 45 degrees for the first out-of-plane bend.

19. An aerospace vehicle, wherein the aerospace vehicle includes a passive thermal system, and wherein the passive thermal system comprises:
a first core-bearing radiator panel, a second core-bearing radiator panel, and a third core-bearing radiator panel, wherein the first core-bearing radiator panel and the third core-bearing radiator panel are arranged opposite each other and linked in part by the second core-bearing radiator panel, wherein the first core-bearing radiator panel and the third core-bearing radiator panel are in non-parallel planes, and the first core-bearing radiator panel and the third core-bearing radiator panel exhibit a structural divergence about a central axis of the aerospace vehicle relative to each other being disposed in the non-parallel planes in that the non-parallel planes tend to diverge from each other in an earth-facing direction about the central axis of the aerospace vehicle;
a first heat pipe;
a solar panel; and
a y-bar coupled to the solar panel and configured to pass through a y-bar opening in the first core-bearing radiator panel,
wherein the y-bar is configured to permit a rotation of the solar panel to enhance exposure to sunlight.

20. The aerospace vehicle of claim 19, wherein the aerospace vehicle further comprises:
a lower panel configured to fit below the second core-bearing radiator panel, wherein the lower panel is of aero-space grade material;
a battery module behind the lower panel, wherein the solar panel is configured to charge the battery module; and
a motor;
wherein the y-bar is further configured to pass through a y-bar opening in the first core-bearing radiator panel to the motor, wherein the y-bar is further configured to permit the rotation of the solar panel by the motor to enhance the exposure to sunlight, and wherein a first portion of the first heat pipe is at a first elevation above the y-bar opening, and a second portion of the first heat pipe is at the first elevation above the lower panel.

21. The aerospace vehicle of claim 1, further comprising:
a plurality of payload antennas distributed on an external portion of an earth-facing surface of the aerospace vehicle, wherein the payload antennas are configured to provide a plurality of payload signals to a plurality of user terminals.

22. The aerospace vehicle of claim 21, further comprising:
a plurality of reaction wheels distributed on an internal portion of a space-facing surface, wherein the space-side surface is disposed opposite to the earth-facing surface.

* * * * *